US007032150B2

(12) United States Patent
Wu et al.

(10) Patent No.: US 7,032,150 B2
(45) Date of Patent: Apr. 18, 2006

(54) METHOD AND APPARATUS FOR MEASURING GROUP DELAY OF A DEVICE UNDER TEST

(75) Inventors: Ching-Shan Wu, Hsinchu (TW); Chien-Ming Chen, Hsinchu (TW)

(73) Assignee: Mediatek Inc., (TW)

(*) Notice: Subject to any disclaimer, the term of this patent is extended or adjusted under 35 U.S.C. 154(b) by 339 days.

(21) Appl. No.: 10/262,746

(22) Filed: Oct. 2, 2002

(65) Prior Publication Data

US 2003/0233599 A1 Dec. 18, 2003

(30) Foreign Application Priority Data

Jun. 12, 2002 (TW) .............................. 91112824 A

(51) Int. Cl.
*G01R 31/28* (2006.01)
*G01R 31/26* (2006.01)

(52) U.S. Cl. ...................... 714/734; 714/700; 714/742; 324/75; 324/765

(58) Field of Classification Search ................ 714/700, 714/734, 742; 324/755, 763
See application file for complete search history.

(56) References Cited

U.S. PATENT DOCUMENTS 3,968,427 A * 7/1976 Sharrit ...................... 324/621
4,451,782 A * 5/1984 Ashida .................... 324/76.26
5,157,652 A * 10/1992 Walker ...................... 370/252
5,166,641 A * 11/1992 Davis et al. ............... 331/1 A
5,179,344 A * 1/1993 Najle et al. ................ 324/613
5,231,598 A * 7/1993 Vlahos ...................... 714/700
5,831,423 A * 11/1998 Mancini .................. 324/76.77
5,875,213 A * 2/1999 Asami et al. ............... 375/336
6,208,946 B1 * 3/2001 Arakawa et al. .............. 702/77
6,486,961 B1 * 11/2002 Szfraniec et al. ........... 356/477
6,505,312 B1 * 1/2003 Takeuchi et al. ............ 714/700

* cited by examiner

*Primary Examiner*—Albert Decady
*Assistant Examiner*—Esaw Abraham
(74) *Attorney, Agent, or Firm*—Brinks Hofer Gilson & Lione

(57) ABSTRACT

In a method of measuring group delay ($T_{gd}$) of a device under test, an analog input signal having a predetermined period (T) is provided to the device under test so as to obtain a delayed output signal from the device under test. A phase difference is detected between first and second digital signals converted from the analog input signal and the delayed output signal, respectively. A current (I) corresponding to the phase difference flows through a circuit having a predetermined resistance (R) so as to result in a potential difference ($\Delta V$). As such, the group delay ($T_{gd}$) of the device under test is determined as a function of the predetermined period (T), the current (I), the predetermined resistance (R), and the potential difference ($\Delta V$). An apparatus for measuring the group delay ($T_{gd}$) of the device under test is also disclosed.

9 Claims, 4 Drawing Sheets

METHOD AND APPARATUS FOR MEASURING GROUP DELAY OF A DEVICE UNDER TEST

BACKGROUND OF THE INVENTION

1. Field of the Invention

The invention relates to a method and apparatus for measuring group delay of a device under test, more particularly to a method and apparatus for measuring group delay of a device under test that utilize a single-tone analog input signal.

2. Description of the Related Art

Group delay of most electronic devices will result in non-negligible influences. For example, in a data storage system, if group delay of an internal electronic device of the data storage system cannot not be managed, correct timing sequence during data reproduction cannot be ensured, which can result in incorrect decoding of data. Furthermore, for digital communication systems, if group delay cannot be properly processed, non-linear distortion of transmission signals cannot be avoided. As such, measurement of group delay of an electronic device is very important.

In a conventional method of measuring group delay ($T_{gd}$) of a device under test having a high cut-off frequency band, a multi-tone signal, which is a high frequency signal, is provided to the device under test. As shown in FIG. 1, the multi-tone signal, which is provided from a multi-tone input source, includes two high frequency components 11, 12. There exists a frequency difference (Δf) between the high frequency components 11, 12. For example, the high frequency components 12, 11 may be 40 MHz and 40.05 MHz, respectively. A phase difference (ΔP) between the high frequency components 11, 12 can be calculated by discrete Fourier transform using relevant analysis instruments after passing the device under test (DUT). As such, the group delay ($T_{gd}$) equal to $-\Delta P/\Delta f$ may be obtained accordingly.

However, in order to obtain a precise measurement, the analysis instruments used in the aforesaid method must include a high-speed digitizer for high-speed digitizing of the high frequency components 11, 12, and a high-resolution measuring device for calculating the phase difference (ΔP). Unfortunately, the high-speed digitizer and the high-resolution measuring device are very expensive and use of the same results in high costs.

SUMMARY OF THE INVENTION

Therefore, the object of the present invention is to provide a method and apparatus for measuring group delay of a device under test at a relatively low cost.

According to one aspect of the present invention, a method of measuring group delay ($T_{gd}$) of a device under test comprises the steps of:

(a) providing an analog input signal having a predetermined period (T) to the device under test so as to obtain a delayed output signal from the device under test;

(b) converting the analog input signal and the delayed output signal into first and second digital signals, respectively;

(c) detecting a phase difference between the first and second digital signals;

(d) generating a current (I) corresponding to the phase difference;

(e) allowing the current (I) to flow through a circuit having a predetermined resistance (R) so as to result in a potential difference (ΔV); and (f) determining the group delay ($T_{gd}$) of the device under test as a function of the predetermined period (T), the current (I), the predetermined resistance (R) and the potential difference (ΔV).

According to another aspect of the present invention, a method of measuring group delay ($T_{gd}$) of a device under test comprises the steps of (a) performing a calibrating operation that includes the sub-steps of

- (a-1) providing an analog input signal having a predetermined period (T),
- (a-2) converting the analog input signal into digital first and second calibrating signals,
- (a-3) detecting a calibrating phase difference between the first and second calibrating signals,
- (a-4) generating a calibrating current (I') corresponding to the calibrating phase difference, and
- (a-5) allowing the calibrating current (T') to flow through a circuit having a predetermined resistance (R) so as to result in a calibrating potential difference (ΔV');

(b) performing a measuring operation that includes the sub-steps of

- (b-1) providing the analog input signal to the device under test so as to generate a delayed output signal from the device under test,
- (b-2) converting the analog input signal and the delayed output signal into first and second digital signals, respectively,
- (b-3) detecting a measuring phase difference between the first and second digital signals,
- (b-4) generating a measuring current (I) corresponding to the measuring phase difference, and
- (b-5) allowing the measuring current (I) to flow through the circuit having the predetermined resistance (R) so as to result in a measuring potential difference (ΔV); and (c) determining the group delay ($T_{gd}$) of the device under test as a function of the predetermined period (T), the measuring current (I), the predetermined resistance (R), and a difference between the calibrating potential difference (ΔV') and the measuring potential difference (ΔV).

According to still another aspect of the present invention, an apparatus is used for measuring group delay ($T_{gd}$) of a device under test that has input and output ends, and comprises:

a signal source adapted to be connected to the input end of the device under test so as to provide an analog input signal having a predetermined period (T) to the input end of the device under test, thereby enabling the device under test to generate a delayed output signal at the output end thereof;

a first analog-to digital converter connected to the signal source for receiving the analog input signal therefrom and for converting the analog input signal into a first digital signal;

a second analog-to-digital converter adapted to be connected to the output end of the device under test for receiving the delayed output signal therefrom and for converting the delayed output signal into a second digital signal;

a phase detector connected to the first and second analog-to-digital converters for receiving and detecting a measuring phase difference between the first and second digital signals;

a current pump unit connected to the phase detector for generating a measuring current (I) corresponding to the measuring phase difference detected by the phase detector; and a circuit having a predetermined resistance (R) and connected to the current pump unit, the circuit generating a measuring potential difference (ΔV) when the measuring current (I) flows therethrough;

whereby, the group delay ($T_{gd}$) of the device under test is determined as a function of the predetermined resistance (R), the predetermined period (T), the measuring current (I), and the measuring potential difference (ΔV).

BRIEF DESCRIPTION OF THE DRAWINGS

Other features and advantages of the present invention will be come apparent in the following detailed description of the preferred embodiment with reference to the accompanying drawings, of which.

DETAILED DESCRIPTION OF THE PREFERRED EMBODIMENT

Figure 1:
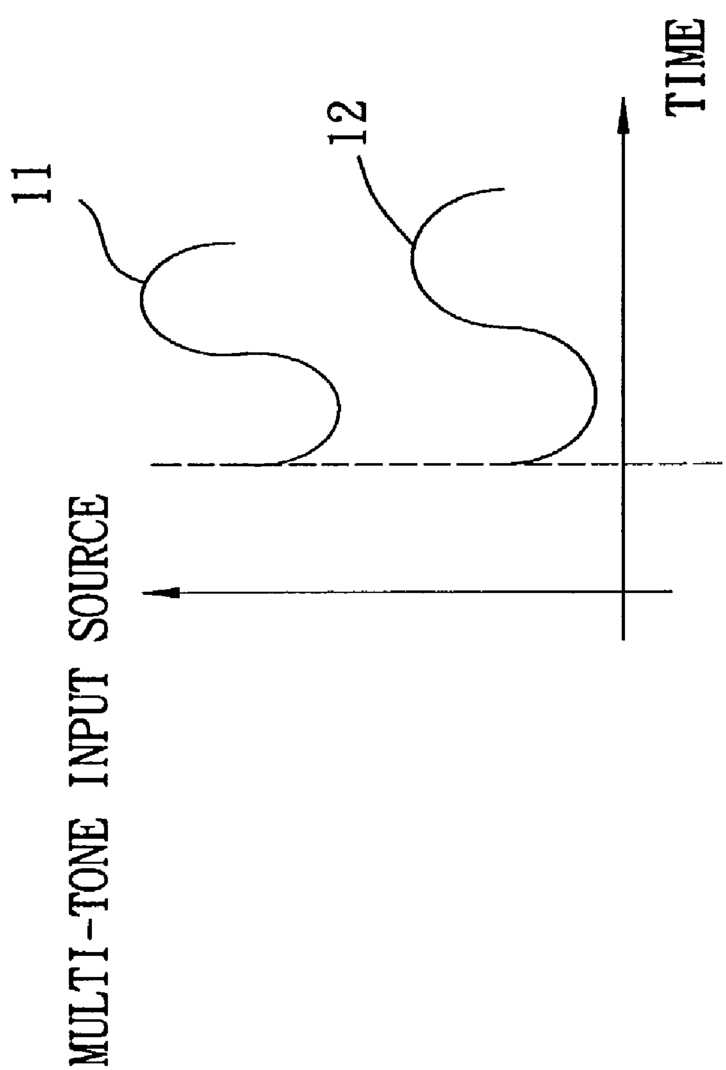
FIG. 1 illustrates two frequency components of a multi tone signal used in a conventional method of measuring group delay.
Figure 2:
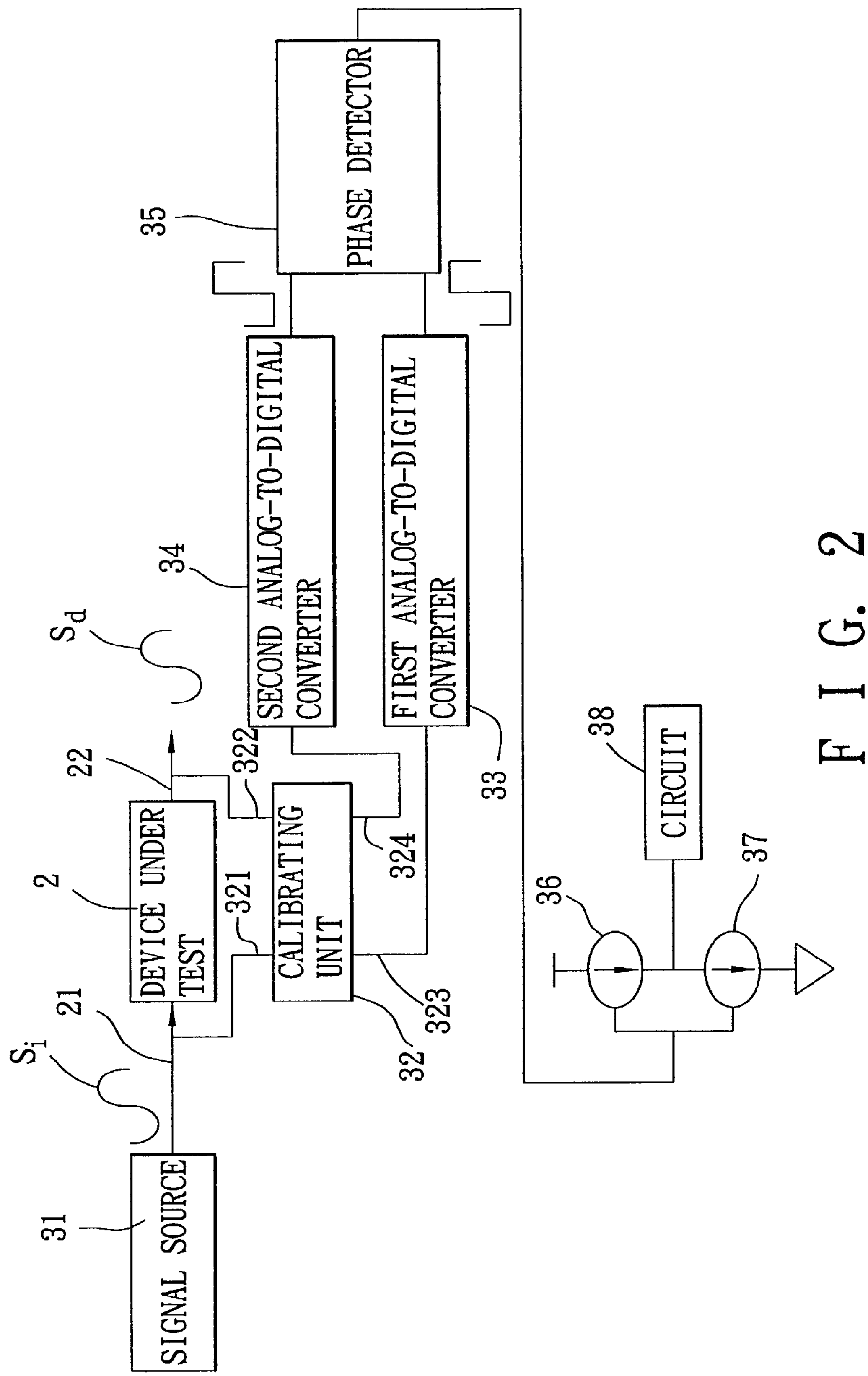
FIG. 2 is a schematic circuit block diagram illustrating the preferred embodiment of an apparatus for measuring group delay of a device under test.

Referring to FIG. 2, the preferred embodiment of an apparatus for measuring group delay ($T_{gd}$) of a device under test 2 according to the present invention is shown to include a signal source 31, a calibrating unit 32, a first analog-to-digital converter 33, a second analog-to-digital converter 34, a phase detector 35, a current pump unit, and a circuit 38. The device under test 2 has input and output ends 21, 22.

The signal source 31 is adapted to be connected to the input end 21 of the device under test so as to provide an analog input signal ($S_i$), which is a single-tone signal, having a predetermined period (T) to the input end 21 of the device under test 2, thereby enabling the device under test 2 to generate a delayed output signal ($S_d$) at the output end 22 thereof. In this embodiment, the analog input signal ($S_i$) provided by the signal source 31 is a sinusoidal wave signal.

Figure 3:
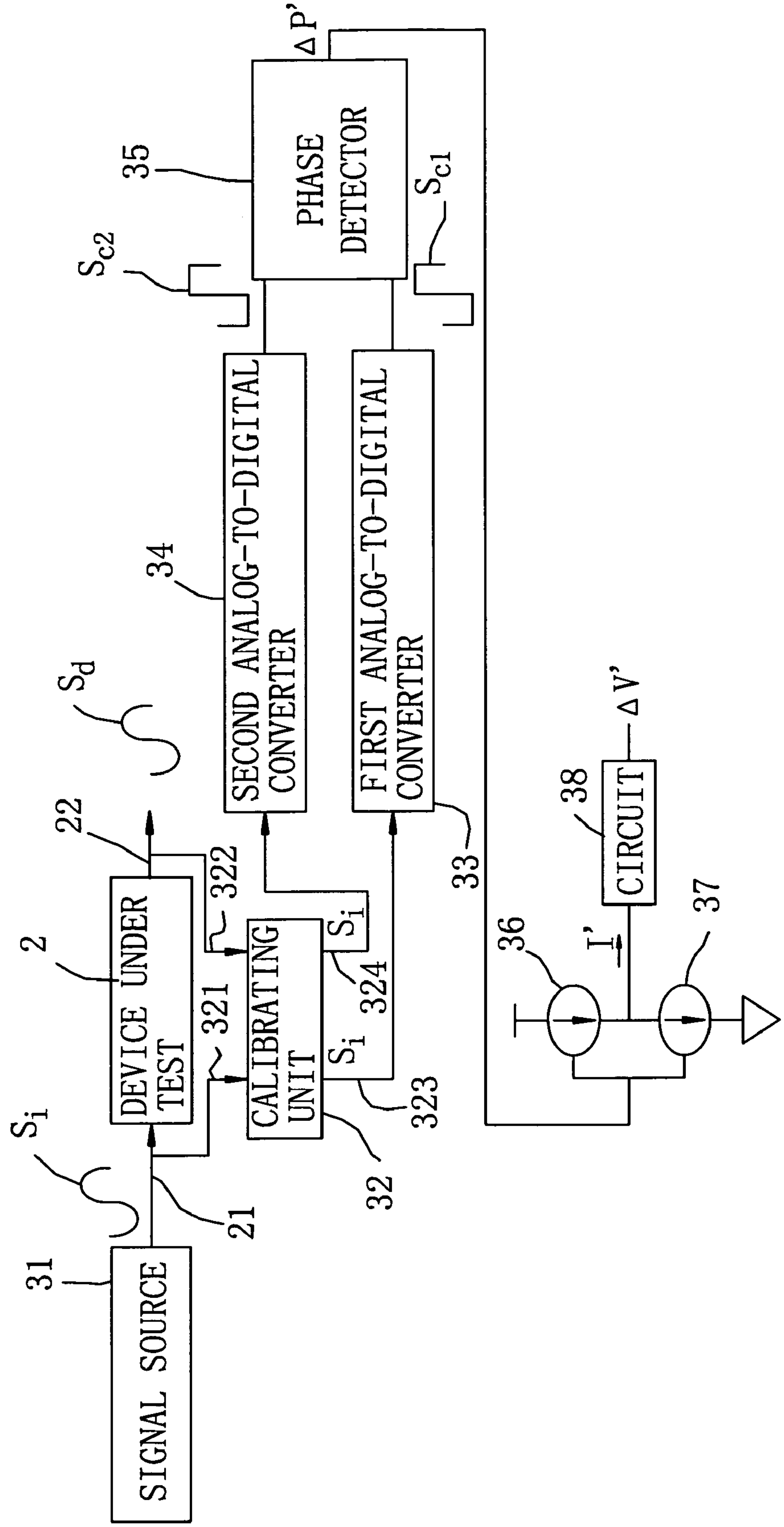
FIG. 3 is a schematic circuit block diagram illustrating the preferred embodiment when a calibrating unit operates in a calibrating mode.

The calibrating unit 32 has a first input 321 adapted to be connected to the input end 21 of the device under test 2, a second input 322 adapted to be connected to the output end 22 of the device under test 2, and first and second outputs 323, 324. The calibrating unit 32 is operable in a selected one of a calibrating mode and a measuring mode. In this embodiment, the calibrating unit 32 is a calibration multiplexer. As such, the calibrating unit 32 outputs the analog input signal ($S_i$) simultaneously at the first and second outputs 323, 324 when operated in the calibrating mode (see FIG. 3), and outputs the analog input signal ($S_i$) and the delayed output signal ($S_d$) at the first and second output 323, 324, respectively, when operated in the measuring mode (see FIG. 4).

The first analog-to-digital converter 33 is connected to the first output 323 of the calibrating unit 32. When the calibrating unit 32 is operated in the calibrating mode, the first analog-to-digital converter 33 receives the analog input signal ($S_i$) from the first output 323 of the calibrating unit 32, and converts the analog input signal ($S_i$) into a digital first calibrating signal ($S_{c1}$) (see FIG. 3). When the calibrating unit 32 is operated in the measuring mode, the first analog-to-digital converter 33 receives the analog input signal ($S_i$) from the first output 323 of the calibrating unit 32, and converts the analog input signal ($S_i$) into a first digital signal ($S_1$) (see FIG. 4).

The second analog-to-digital converter 34 is connected to the second output 324 of the calibrating unit 32. When the calibrating unit 32 is operated in the calibrating mode, the second analog-to-digital converter 34 receives the analog input signal ($S_i$) from the second output 324 of the calibrating unit 32, and converts the analog input signal ($S_i$) into a digital second calibrating signal ($S_{c2}$) (see FIG. 3). When the calibrating unit 32 is operated in the measuring mode, the second analog-to-digital converter 34 receives the delayed output signal ($S_d$) from the second output 324 of the calibrating unit 32, and converts the delayed output signal ($S_d$) into a second digital signal ($S_2$) (see FIG. 4).

The phase detector 35 is connected to the first and second analog-to-digital converters 33, 34. When the calibrating unit 32 is operated in the calibrating mode, the phase detector 35 receives the digital first and second calibrating signals ($S_{c1}$, $S_{c2}$) from the first and second analog-to-digital converters 33, 34, and detects a calibrating phase difference (ΔP') between the digital first and second calibrating signals ($S_{c1}$, $S_{c2}$) (see FIG. 3). When the calibrating unit 32 is operated in the measuring mode, the phase detector 35 receives the first and second digital signals ($S_1$, $S_2$) from the first and second analog-to-digital converters 33, 34, and detects a measuring phase difference (ΔP) between the first and second digital signals ($S_1$, $S_2$) (see FIG. 4).

Figure 4:
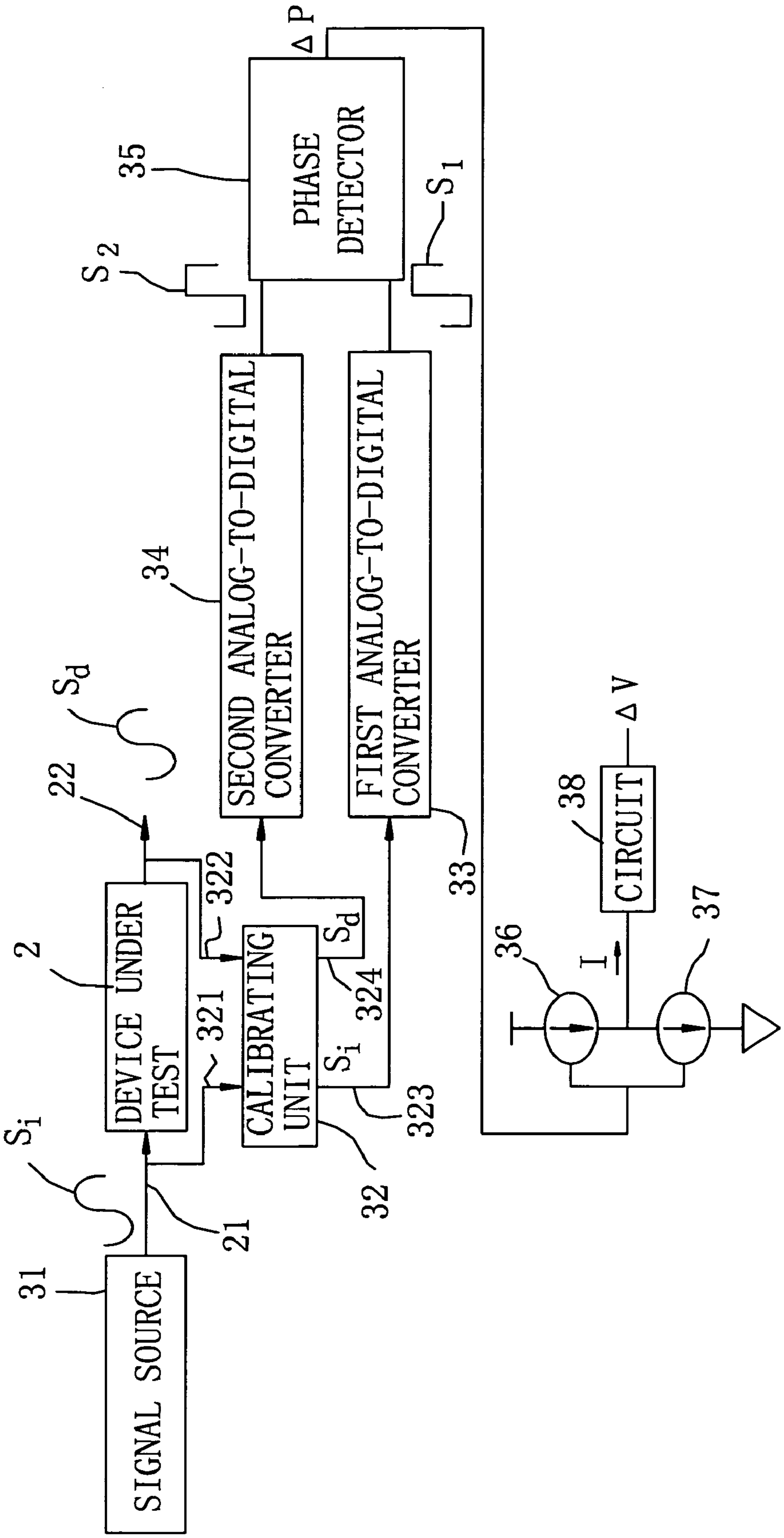
FIG. 4 is a schematic circuit block diagram illustrating the preferred embodiment when the calibrating unit operates in a measuring mode.

The current pump unit is connected to the phase detector 35 for generating a calibrating current (I') corresponding to the calibrating phase difference (ΔP') detected by the phase detector 35 when the calibrating unit 32 is operated in the calibrating mode (see FIG. 3), and a measuring current (I) corresponding to the measuring phase difference (ΔP) detected by the phase detector 35 when the calibrating unit 32 is operated in the measuring mode (see FIG. 4). In this embodiment, the current pump unit includes a series connection of two current pumps 36, 37 that are controlled by the phase detector 35.

The circuit 38 has a predetermined resistance (R) and is connected to the current pump unit. The circuit 38 generates a calibrating potential difference (ΔV') due to flow of the calibrating current (I') therethrough when the calibrating unit 32 is operated in the calibrating mode, and a measuring potential difference (ΔV) due to flow of the measuring current (I) therethrough when the calibrating unit 32 is operated in the measuring mode. In this embodiment, the circuit 38 through which the calibrating or measuring current (I', I) flows is a low-pass filter.

As such, the group delay ($T_{gd}$) of the device under test 2 can be determined as a function of the predetermined resistance (R), the predetermined period (T), the measuring current (I), and a difference between the measuring potential difference (ΔV) and the calibrating potential difference (ΔV') That is, the group delay ($T_{gd}$) is equal to $(\Delta V-\Delta V')\times T/(I\times R)$. It is noted that, in an ideal condition (i.e., the apparatus of the present invention does not introduce mismatch) the calibrating potential difference (ΔV') measured by the preferred embodiment when in the calibrating mode is approximately equal to zero such that the group delay ($T_{gd}$) can be simplified to be equal to $\Delta V\times T/(I\times R)$.

In sum, the preferred embodiment uses the phase detector 35 so as to obtain the phase difference (ΔP) between the first and second digital signals ($S_1$, $S_2$) converted from the analog input signal ($S_i$) and the delayed output signal ($S_d$), and the current (I) corresponding to the phase difference (ΔP) is then generated such that the potential difference (ΔV) as a result of the flow of the current (I) through the circuit 38 having the predetermined resistance (R) can be easily and precisely determined. Therefore, there is no need to calculate the actual phase difference between the analog input signal ($S_i$) and the delayed output signal ($S_d$) such that the expensive high-speed digitizer and high-resolution measuring device used in the prior art can be eliminated, thereby resulting in lower costs. The object of the invention is thus met.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A method of measuring group delay ($T_{gd}$) of a device under test, comprising the steps of:

(a) providing an analog input signal having a predetermined period (T) to the device under test to obtain a delayed output signal from the device under test;

(b) converting the analog input signal and the delayed output signal into first and second digital signals, respectively;

(c) detecting a phase difference between the first and second digital signals;

(d) generating a current (I) corresponding to the phase difference;

(e) feeding the current (I) to a low-pass filter containing a predetermined resistance (R) to generate a potential difference (ΔV); and (f) determining the group delay ($T_{gd}$) of the device under test according to the predetermined period (T), the current (I), the predetermined resistance (R), and the potential difference (ΔV).

2. The method as claimed in claim 1, wherein the analog input signal is a sinusoidal wave signal.

3. The method as claimed in claim 1, wherein each of the first and second digital signals are square wave signals.

4. The method as claimed in claim 1, wherein the current (I) is generated by a current pump unit in step (d).

5. A method of measuring group delay ($T_{gd}$) of a device under test, comprising the steps of:

(a) performing a calibrating operation that includes the sub-steps of (a-1) providing an analog input signal having a predetermined period (T), (a-2) converting the analog input signal into first and second calibrating digital signals, (a-3) detecting a calibrating phase difference between the first and second calibrating digital signals, (a-4) generating a calibrating current (I') corresponding to the calibrating phase difference, and (a-5) feeding the calibrating current (I') to a low-pass filter containing a predetermined resistance (R) to generate a calibrating potential difference (ΔV');

(b) performing a measuring operation that includes the sub-steps of (b-1) providing the analog input signal to the device under test to generate a delayed output signal from the device under test, (b-2) converting the analog input signal and the delayed output signal into first and second digital signals, respectively, (b-3) detecting a measuring phase difference between the first and second digital signals, (b-4) generating a measuring current (I) corresponding to the measuring phase difference, and (b-5) feeding the measuring current (I) to the lowpass filter containing the predetermined resistance (R) to generate a measuring potential difference (ΔV); and (c) determining the group delay ($T_{gd}$) of the device under test according to the predetermined period (T), the measuring current (I), the predetermined resistance (R), and a difference between the calibrating potential difference (ΔV') and the measuring potential difference (ΔV).

6. An apparatus for measuring group delay ($T_{gd}$) of a device under test that has input and output ends, said apparatus comprising:

a signal source connected to the input end of the device under test to provide an analog input signal having a predetermined period (T) to the input end of the device under test, thereby enabling the device under test to generate a delayed output signal at the output end thereof;

a first analog-to-digital converter connected to said signal source for receiving the analog input signal therefrom and for converting the analog input signal into a first digital signal;

a second analog-to-digital converter connected to the output end of the device under test for receiving the delayed output signal therefrom and for converting the delayed output signal into a second digital signal;

a phase detector connected to said first and second analog-to-digital converters for receiving the first and second digital signals and for detecting a measuring phase difference between the first and second digital signals;

a current pump unit connected to said phase detector for generating a measuring current (I) corresponding to the measuring phase difference detected by said phase detector; and a low-pass filter having a predetermined resistance (R) and connected to said current pump unit, said low-pass filter receiving the measuring current (I) and generating a measuring potential difference (ΔV);

whereby, the group delay ($T_{gd}$) of the device under test is calculated according to the predetermined resistance (R), the predetermined period (T), the measuring current (I), and the measuring potential difference (ΔV).

7. The apparatus as claimed in claim 6, further comprising a calibrating unit having a first input connected to the input end of the device under test, a second input connected to the output end of the device under test, a first output connected to said first analog-to-digital converter, and a second output connected to said second analog-to-digital converter, said calibrating unit configured to operate in a selected one of a calibrating mode and a measuring mode, said calibrating unit providing the analog input signal and the delayed output signal to said first and second analog-to-digital converters, respectively, when operated in the measuring mode, said calibrating unit, when operated in the calibrating mode, providing the analog input signal simultaneously to said first and second analog-to-digital converters such that said first and second analog-to-digital converters convert the analog input signal into first and second calibrating digital signals, such that said phase detector detects a calibrating phase difference between the first and second calibrating digital signals, such that said current pump unit generates a calibrating current (I') corresponding to the calibrating phase difference, and such that said low-pass filter generates a calibrating potential difference (ΔV');

whereby, the group delay ($T_{gd}$) is calculated according to the predetermined period (T), the measuring current (I), the predetermined resistance (R), and a difference between the calibrating potential difference (ΔV') and the measuring potential difference (ΔV).

8. The apparatus as claimed in claim 6, wherein the analog input signal provided by said signal source is a sinusoidal wave signal.

9. The apparatus as claimed in claim 6, wherein said current pump unit includes a series connection of two current pumps that are controlled by said phase detector.

* * * * *